United States Patent [19]
Anderson

[11] Patent Number: 5,193,450
[45] Date of Patent: Mar. 16, 1993

[54] RESIDUE REDUCING BELT ROLLER CONSTRUCTION FOR ROUND BALERS

[75] Inventor: J. Dale Anderson, Canton, Kans.

[73] Assignee: Hay & Forage Industries, Hesston, Kans.

[21] Appl. No.: 811,017

[22] Filed: Dec. 20, 1991

[51] Int. Cl.⁵ .............................................. B30B 5/06
[52] U.S. Cl. ....................................... 100/88; 56/341; 198/817
[58] Field of Search ............... 100/5, 88; 53/118, 587; 56/341; 198/817, 842, 843

[56] References Cited

U.S. PATENT DOCUMENTS

| | | | |
|---|---|---|---|
| 2,271,166 | 1/1942 | Weiss | 198/842 X |
| 2,720,828 | 10/1955 | Burns | 100/88 |
| 3,082,858 | 3/1963 | King | 198/842 X |
| 4,182,101 | 1/1980 | Gaeddert et al. | 100/88 X |
| 4,336,750 | 6/1982 | White et al. | 100/88 |
| 4,409,783 | 10/1983 | Gaeddert | 56/341 |
| 4,428,282 | 1/1984 | Anstey | 100/88 |

Primary Examiner—Harvey C. Hornsby
Assistant Examiner—Stephen F. Gerrity
Attorney, Agent, or Firm—Hovey, Williams, Timmons & Collins

[57] ABSTRACT

A transverse belt guide roll of the baler has its main cylindrical body portion provided with opposite end extremities which are spaced inwardly from the opposite sidewalls of the baler. Reduced diameter stub shafts project outwardly beyond the end extremities and into bearings supported by the sidewalls while the endmost belts along the roll have marginal edge portions which overhang the end extremities of the roll body to thereby eliminate a pinch point for loose residue between the belt edges and the surface of the roll body. Special annular components surrounding the otherwise exposed portions of the shaft ends serve as a shield to prevent the ingress of loose residue into the stub shafts for migration to the bearing assemblies. An alternative embodiment has the overhanging belt margins on one of the idler rolls carried by a vertically swingable belt control arm of the baler.

24 Claims, 4 Drawing Sheets

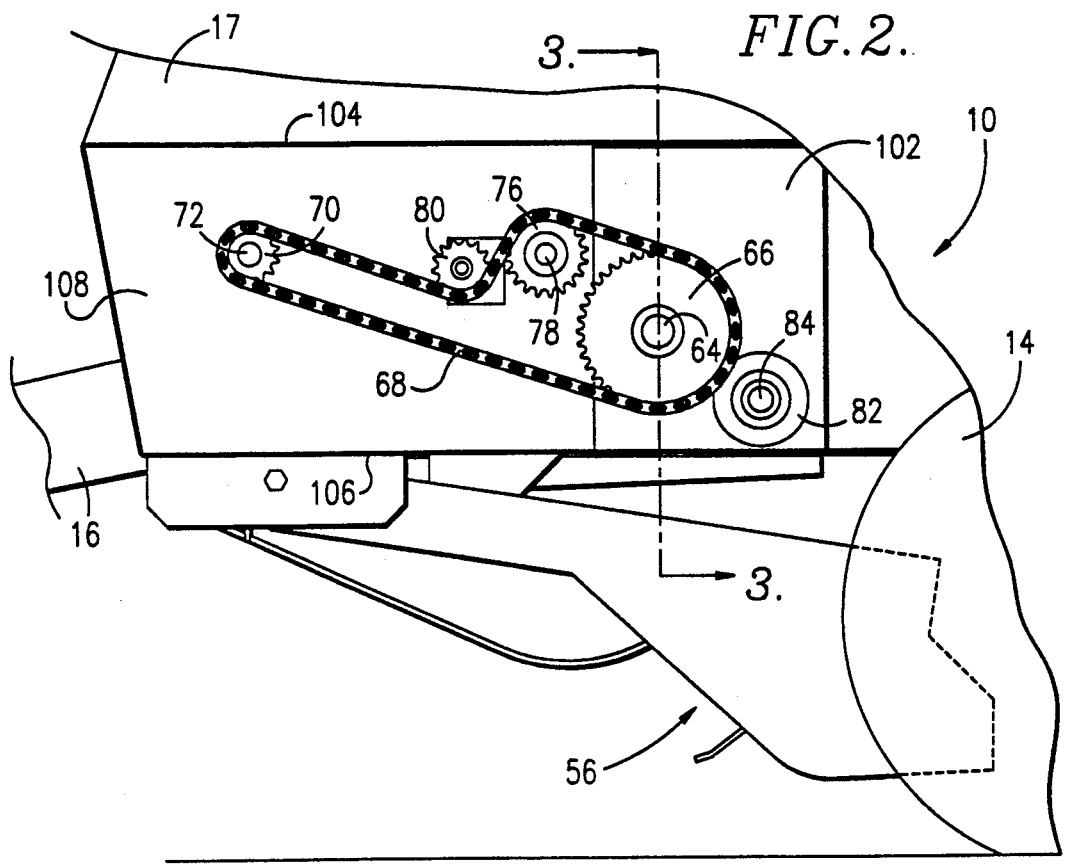
FIG. 2.
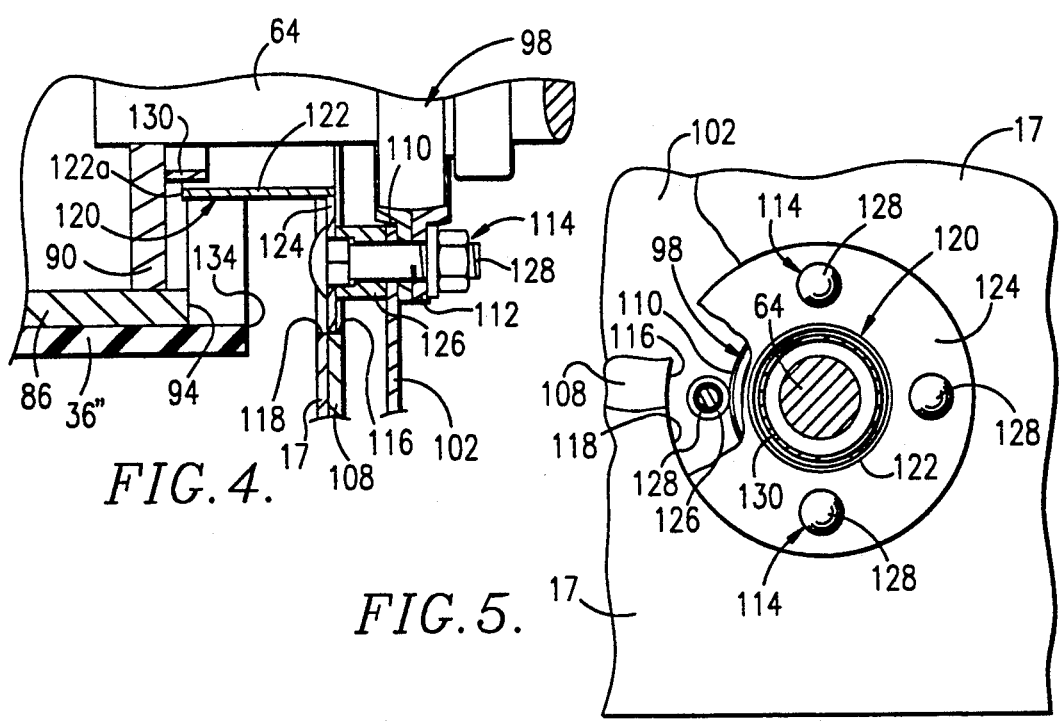
FIG. 4.
FIG. 5.

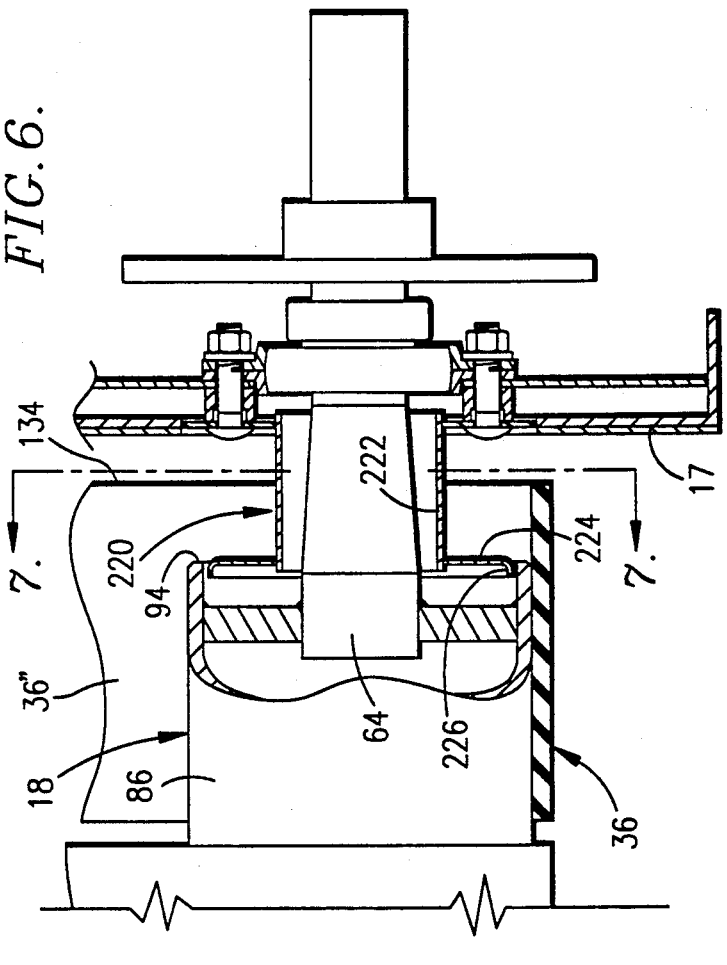
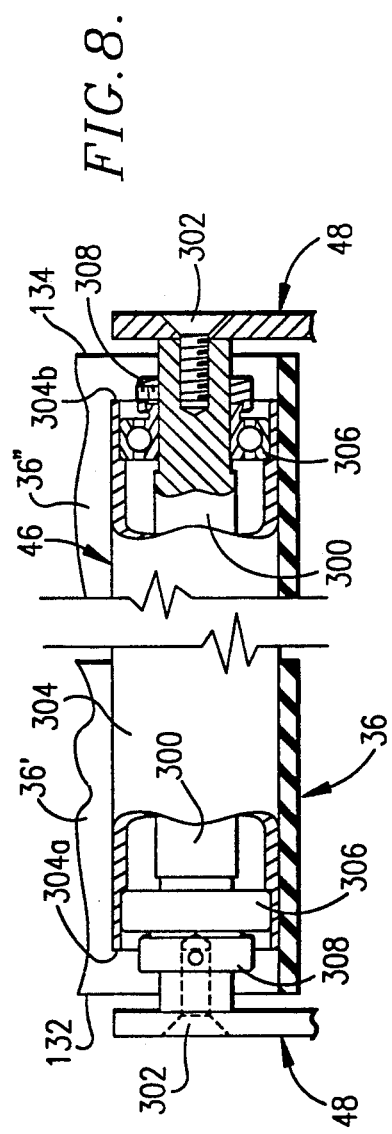
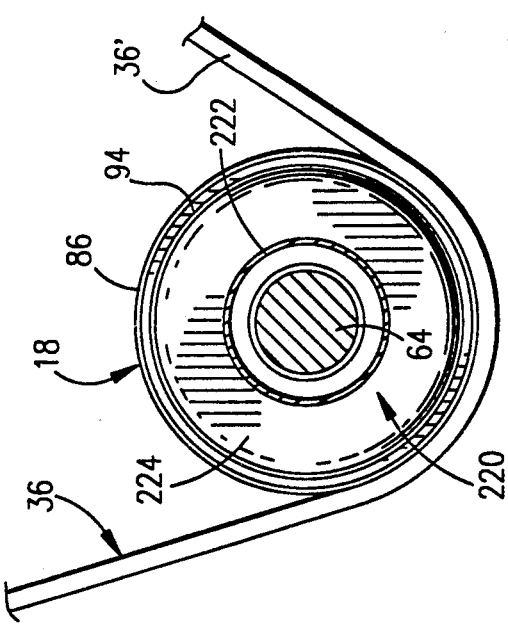

RESIDUE REDUCING BELT ROLLER CONSTRUCTION FOR ROUND BALERS

TECHNICAL FIELD

This invention relates to round balers and, more particularly, to a way of reducing the accumulation of crop residue in such a baler created during baling operations.

BACKGROUND

As a bale is being formed in belt-type machines, the belts which apply compactive pressure to the bale during its growth also impart a driving, rotative force to the bale so that the bale rolls in the baling chamber and progressively accumulates additional layers of crop material about its periphery. The belts tend to abrade the bale to a certain extent and to slip somewhat relative to the surface of the bale so that some amounts of loose residue are always present. Particularly susceptible are those guide rolls which have belt stretches moving generally toward the rolls and against the surface of the bale. In those situations, the loose materials tend to be delivered by the belt stretches into the vicinity of the rolls and to accumulate in various regions on or about such rolls, sometimes wrapping on the rolls and causing a variety of undesirable problems.

Furthermore, as the bale spins within the baling chamber during formation, its opposite ends rub against opposite sidewalls of the machine and tend to become frayed or fuzzed out. The loose stems of the crop material may become gripped by a nip point formed between the edge of an adjacent belt and the guide roll around which the belt is looped, thus pulling the stems from the bale. However, as the belt moves on around the roll and leaves the point of contact with the roll, the belt releases the material and allows it to accumulate in areas where it is difficult to remove, or to wrap around various moving mechanisms in the vicinity.

SUMMARY OF THE INVENTION

Accordingly, one important object of the present invention is to provide an improved guide roll construction which eliminates the formation of a nip point between the outer edge of the first and last belts on the roll and the surface of the roll itself so there is nothing in this area of the machine to form an aggressive intake point for loose crop residue. In this respect, the present invention contemplates a guide roll in which the main cylindrical body of the roll which makes frictional contact with the underside of the flexible belts is shortened at its opposite ends so that the end belts in the series have marginal edge portions which overhang or overlap the end extremities of the roll body, thereby entirely eliminating contact between the outer edges of the end belts and the cylindrical surface of the roll body. Instead of having the larger diameter cylindrical roll surface beneath the outer edges of the end belts, the roll has reduced diameter shafts at those locations whose outer surfaces are spaced sufficiently radially inwardly from the edges of the belts to preclude the formation of any aggressive pinch point or nip point.

Additionally, the present invention contemplates a construction which continues the highly successful concepts disclosed and claimed in Gaeddert et al. U.S. Pat. No. 4,182,101 assigned to the assignee of the present invention relating in part to a bearing arrangement in which bearings that journal the guide rolls are located outboard of the sidewalls of the machine away from the area of high trash and residue concentration. Also of importance is a new shield construction for the stub shafts at opposite ends of the guide roll. One embodiment includes a pair of relatively telescoped, annular components on the roll and sidewall of the machine and which protectively encircle the stub shaft to hinder the ingress of crop residue and other deleterious materials. A second embodiment utilizes a stationary sleeve mounted on the sidewall and a stationary cover plate which extends radially outwardly from the sleeve to effectively close off the otherwise open annular space at the end of the roll between the stub shaft and the cylindrical body of the roll.

BRIEF DESCRIPTION OF THE DRAWINGS

FIG. 2 is an enlarged, fragmentary side elevational view of the lower left front side of the baler illustrating the exterior drive and bearing arrangement at that location;

FIG. 4 is an enlarged, fragmentary detail view of one end of the guide roll in FIG. 3 showing details of construction;

FIG. 5 is an enlarged, fragmentary cross-sectional view through the guide roll of FIG. 3 taken substantially along line 5—5 of FIG. 3;

FIG. 6 is an enlarged, fragmentary cross-sectional view generally similar to FIG. 3 showing a second embodiment of a shield construction for the otherwise exposed stub shafts of the roll;

FIG. 7 is a fragmentary, cross-sectional view thereof taken substantially along line 7—7 of FIG. 6; and FIG. 8 is a fragmentary view in partial cross-section of the mounting details for one of the idler rolls associated with the belt control arms of the baler illustrating a second embodiment of a roll mounting arrangement.

DETAILED DESCRIPTION

Figure 1:
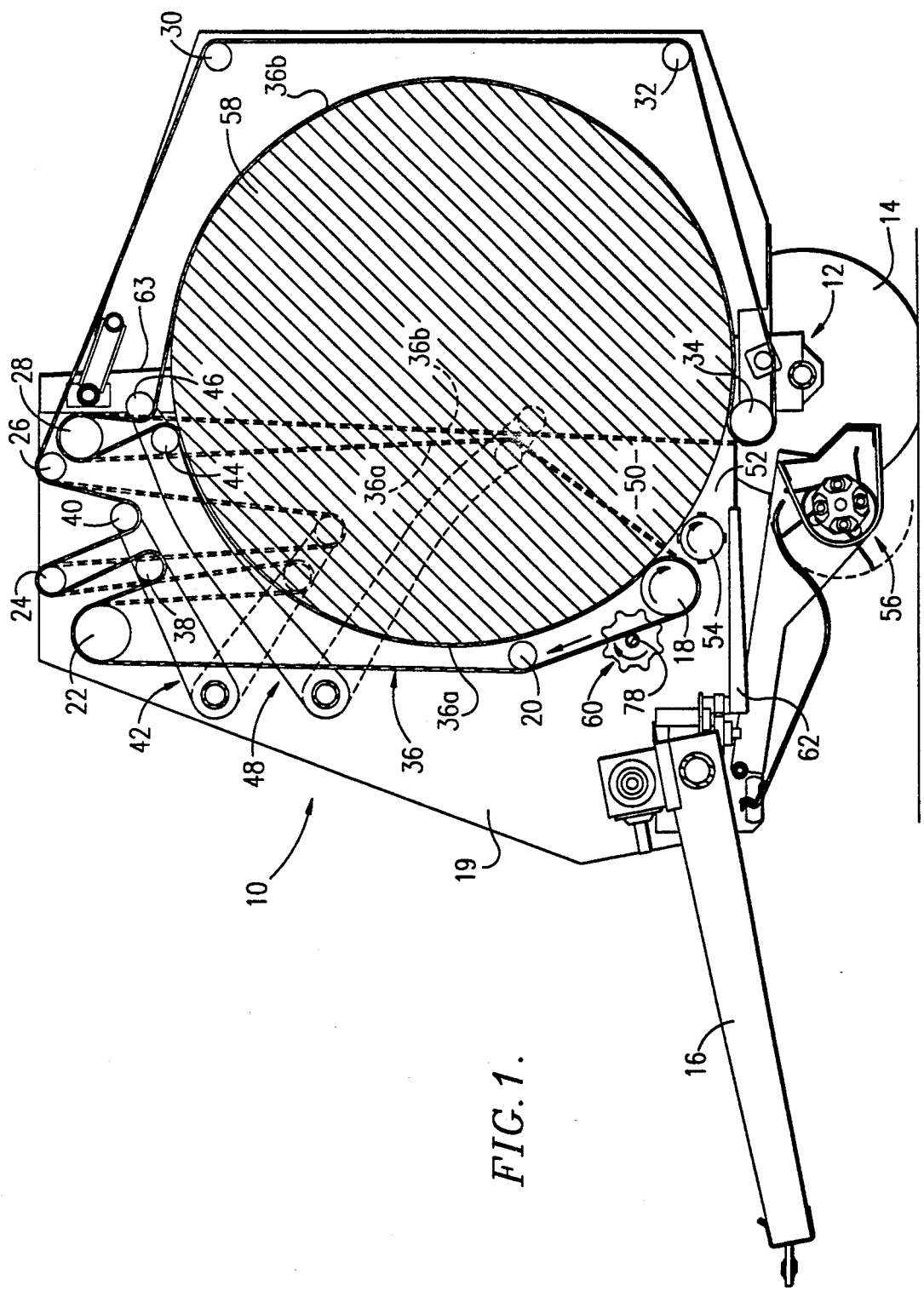
FIG. 1 is a vertical cross-sectional view of a round baler with its near sidewall removed and with which the belt and roll construction in accordance with the present invention may be utilized.

The round baler 10 selected for illustration includes a wheeled chassis 12 having ground wheels 14 and a forwardly extending tongue 16 that is adapted for connection with a towing vehicle (not shown). The chassis 12 carries a pair of upright, laterally spaced sidewalls 17 and 19 which cooperate to define a space within which bale forming and bale wrapping operations may be carried out as the baler is advanced across a field. In the illustrated embodiment, a so-called "variable chamber" machine has been shown wherein the baling chamber is initially relatively small and then grows progressively larger as the bale increases in diameter within the machine. It will be appreciated, however, that the principles of the present invention are also applicable in some regards to a "fixed chamber" machine in which the dimensions of the baling chamber are at least substantially constant throughout the baling cycle, with the diameter of the chamber corresponding substantially to the diameter of the full size bale when completed. One style of fixed chamber machine uses a series of fixed position belt assemblies about the periphery of the baling chamber which could also benefit from the principles of the present invention.

With the foregoing in mind, the variable chamber baler illustrated herein includes a series of cooperating belts and rolls supported by the sidewalls 17,19 for compacting and rolling the bale as it forms within the machine. In this respect, the baler 10 is provided with a plurality of stationary rolls 18,20,22, 24,26,28,30,32, and 34 which span the sidewalls 17,19 in a general circular pattern viewing FIG. 1 for guiding a plurality of endless, side-by-side belts 36 as the belts 36 are driven linearly during bale formation and wrapping. A pair of movable slack takeup rolls 38 and 40 are mounted near the upper portion of the baler on downwardly spring biased arm structure 42 to maintain tension on the belts 36, yet permit the paying out of stored slack as the bale increases in diameter during formation. Near the fore-and-aft center of the baler 10, the belts 36 are looped under the lower roll 18, over the upper roll 28, and under the lower roll 34 to present a pair of opposed, front and rear runs 36a and 36b which are initially generally upright, as illustrated in phantom in FIG. 1, but which become bowed out in fore-and-aft directions, as illustrated in solid lines, as the bale grows beyond its initial starting core dimensions. A pair of retaining rolls 44 and 46 are mounted on a second swingable arm structure 48 that is also spring-biased downwardly toward the phantom line position in FIG. 1, the retaining rolls 44,46 receiving the belt runs 36a and 36b therebetween so as to form a baling chamber 50 between the runs 36a,36b which is bounded at the sides by the sidewalls 17,19.

Initially, the chamber 50 assumes a generally upright, somewhat triangular configuration, as shown in phantom lines in FIG. 1, with the retaining rollers 44,46 at the apex of the chamber 50. Thereafter, the chamber 50 becomes distended and circular in transverse configuration as the growing bale pushes forwardly on the belt run 36a and rearwardly on the belt run 36b to cause additional slack to be paid out and for the arm 48 to rise as additional hay is progressively added to the bale.

The chamber 50 is open at the bottom to present an entrance 52 that is defined between the rear roll 34 and a starter roller 54. A pickup 56 supported generally below the entrance 52 and forwardly of the roll 34 is operable to lift crop material off the field as the baler 10 is advanced and to feed the material into the chamber 50 via the entrance 52.

The roll 18 and the roll 22 are drive rolls for the belts 36 and are driven in clockwise directions viewing FIG. 1. Thus, when the baling chamber 50 is in its initial upright condition, as shown in phantom lines in FIG. 1, the front run 36a is moving generally downwardly and forwardly while the rear run 36b is moving generally upwardly. Consequently, hay introduced into the chamber 50 via the entrance 52 is acted upon by the upwardly moving rear run 36b and the downwardly moving front run 36a so as to tumble forwardly and coil into a growing bale. Assisting in the initial starting of the core and the coil-up action is the starting roller 54 which is driven in a clockwise direction viewing FIG. 1.

During the formation of the bale, which is illustrated in its final size in solid lines in FIG. 1 and is denoted by the numeral 58, a small amount of hay is sloughed off the bale 58 due to slippage between the belts 36 and the surface of the bale, and some of that residue tends to collect within the open area immediately above the roll 18 and forwardly of the front belt run 36a. However, such accumulating material is immediately discharged from that area by the action of the cleanout discs broadly denoted by the numeral 60 in FIG. 1 which protrude into the collecting region and have their protruding portions moving downwardly in a direction opposite to that of the upwardly moving belts 36 in the area. Such cleanout discs 60 are the subject of copending application Ser. No. 07/626,973 filed Dec. 13, 1990, now U.S. Pat. No. 5,097,760, in the names of Howard J. Ratzlaff, et al., assigned to the assignee of the present invention.

Once the bale 58 is fully formed, it is desirable that the bale be tightly wrapped with either twine or a web-type wrapping material such as a net material currently available from Exxon Chemical Company sold under the trade designation "Bale Lok" net wrap. In the event twine is to be used, the baler 10 is provided with a swingable twine dispensing tube 62 located adjacent the front of the baler which performs in the usual way for dispensing a supply of twine to the bale 58. On the other hand, the baler 10 may also be provided with a suitable net wrap attachment (not shown). One suitable net wrap attachment is disclosed in co-pending application Ser. No. 07/772,238, filed Oct. 7, 1991, (pending) in the names of Ratzlaff, et al., assigned to the assignee of the present invention. After the bale is wrapped with string or web material, the rear section of the machine along the parting line 63 may be swung upwardly and rearwardly to open the bale chamber and discharge the finished bale.

FIG. 2 illustrates the means by which the lower drive roll 18 and the cleanout discs 60 receive their driving power. It will be seen in this respect that a stub shaft 64 of the drive roll 18 projects outwardly from the sidewall 17 and has a large sprocket 66 secured thereto. The sprocket 66, in turn, is entrained by a drive chain 68 looped around a front sprocket 70 that is fixed to a cross-shaft 72 operably coupled with a right angle gear box 74 (FIG. 1). The gear box receives driving power through a fore-and-aft extending drive line (not shown) that is ultimately coupled with the power takeoff shaft of the towing vehicle.

The drive chain 68 also entrains a sprocket 76 fixed to a shaft 78 of the cleanout discs 60. An idler sprocket 80 also engages the chain 68 along the slack side thereof to maintain tension. A bearing 82 situated downwardly and rearwardly from the sprocket 66 journals a stub shaft 84 of the starter roll 54, the latter being driven by means not shown on the opposite side of the baler.

Figure 3:
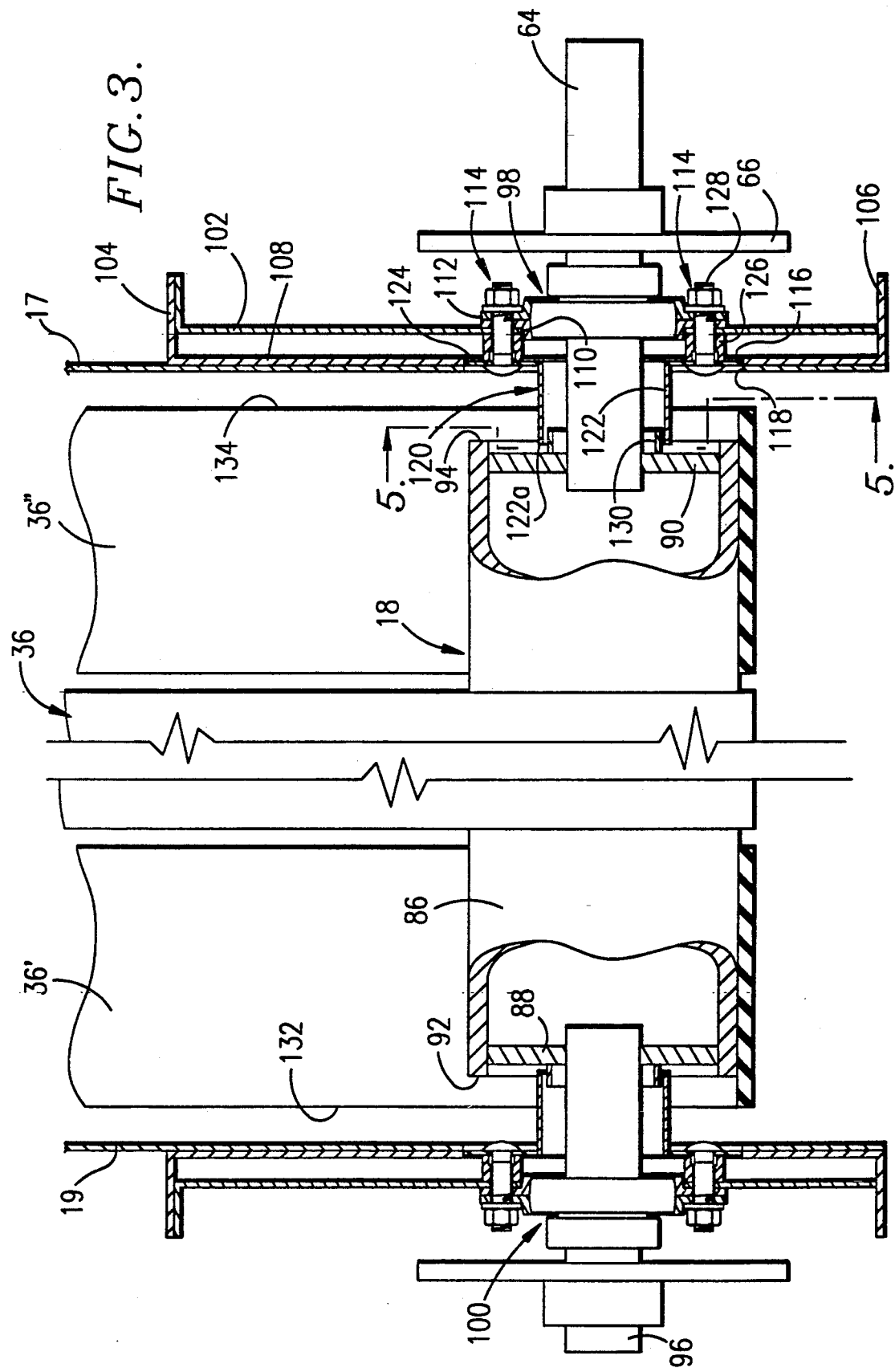
FIG. 3 is a fragmentary transverse cross-sectional view through the baler taken generally along line 3—3 of FIG. 2 and showing the belt and roll relationship in accordance with the present invention which exists in connection with the lower front drive roll of the baler.

As illustrated in particular in FIGS. 3 and 4, the drive roll 18 has an elongated, tubular body 86 of cylindrical configuration and is provided with a pair of bulkheads or end walls 88 and 90 which close the opposite ends of the body 86. The end walls 88,90 are welded in place and are slightly inset from the opposite extremities 92 and 94 of the body 86. The roll 18 also includes a pair of coaxial stub shafts projecting from opposite ends of body 86, one of which has been previously denoted by the numeral 64 and the other of which is now designated by the numeral 96. The stub shafts 64 and 96 are welded to their respective end walls 90 and 88 and serve to provide rotative support for the roll 18 in cooperation with respective bearing assemblies 98 and 100 carried by the sidewalls 17 and 19, respectively.

Although the stub shaft 64 is slightly longer than the stub shaft 96, in other respects the opposite ends of the roll 18 and their relationships to the belts 36 and the sidewalls 17,19 are identical. Therefore, only details of construction associated with the right end of the roll 18 viewing FIG. 3 will be described, with the understanding that such details apply equally as well to the left end of the roll 18 viewing FIG. 3.

The bearing 98 which journals the stub shaft 64 is located a short distance outboard of the sidewall 17. Direct support for the bearing assembly 98 is provided by an upright panel 102 fixed at its upper and lower ends to outturned flanges 104 and 106 of a generally fore-and-aft extending reinforcing plate 108 that lies against the outside of the sidewall 17 and is fixedly secured thereto. The panel 102 has a generally centrally disposed clearance hole 110 which locates and receives a radially inner portion of the bearing assembly 98, while a radially outer flangette portion 112 overlies the outer surface of the panel 102 adjacent the clearance hole 110. A series of bolt assemblies 114 around the periphery of the flangette portion 112 are used to fasten the bearing assembly 98 to the panel 102.

The reinforcing plate 108 and the sidewall 17 are also provided with clearance openings 116 and 118 respectively (see FIG. 4 for details) which are substantially larger in diameter than the clearance hole 110 but which are coaxially aligned with hole 110 to provide clearance for the stub shaft 64. The enlarged size of the openings 116,118 relative to the diameter of the stub shaft 64 also accommodates the presence of a special shield assembly 120 which helps retard the access of stray crop particles to the stub shaft 64 and hence to the bearing assembly 98. One part of the shield assembly 120 is located on the sidewall 17 and includes a rigid, annular sleeve 122 projecting axially inwardly from the sidewall 17 into the interior of the machine to a point closely adjacent the end wall 90 of the drive roll 18. The sleeve 122 has a flat, annular base 124 that is fixed to the outer end of the sleeve 122 and corresponds closely in diameter to the clearance openings 116 and 118. The base 124 is not attached directly to the sidewall 17 but in instead secured to and supported by the panel 102 by the bolt assemblies 114 which include a series of annular spacers 126 on the bolts 128 of the assemblies 114. The spacers 126 have the effect of offsetting the base 124 a distance inwardly from the panel 102 in the direction of the baling zone, depending upon the thickness of the spacers 126. Thus, the innermost terminus 122a of the sleeve 122 can be positioned closer to or further away from the end wall 90 of the roll 18 depending upon the particular thickness chosen for the spacers 126.

The other component of the shield assembly 120 includes a rigid annular collar 130 on the roll 18. More specifically, the collar 130 is rigidly affixed at one end to the end wall 90 and projects outwardly therefrom for a short distance while encircling the stub shaft 64 in spaced, concentric relationship thereto. The collar 130 is smaller in diameter than the sleeve 122 and projects into the latter for a short distance such that the sleeve 122 and the collar 130 are in a sense mutually relatively telescoped with their free unsupported ends in mutually overlapping relationship to one another.

As illustrated in FIGS. 3 and 4, the end extremities 92,94 of the roll body 86 are spaced laterally inwardly from the respective sidewalls 19 and 17. This is in contrast to the arrangement shown, for example, in the above-identified Gaeddert et al. U.S. Pat. No. 4,182,101 wherein the body of the roll projects through the opposite sidewalls of the baler so that the opposite end extremities of the roll body are disposed slightly outboard of the sidewalls. In the present construction, the length of the roll body 86 is coordinated with the locations for the series of belts 36 along the length of the roll 18 such that the first and last belts in the series, here designated 36' and 36" in FIG. 3, have marginal portions which overlap the respective end extremities 92,94. Thus, the outer edges 132 and 134 of the end belts 36' and 36" are spaced outwardly from the respective end extremities 92 and 94 of the roll body 86. Stated differently, the end extremities 92,94 of the roll body 86 are in recessed relationship with the outer edges 132,134 of the belts 36' and 36" so that the edges 132, 134 have no roll surfaces to engage and form an aggressive pinch point or nip point.

Although there may be some loose crop residue in the vicinity of the opposite ends of the drive roll 18 during operations, the lack of a pinch point at the outer edges 132,134 significantly reduces the tendency for the loose materials to be grabbed by the moving belts 36 at their interfaces with the roller 18 and accumulated or wrapped around vital moving parts. Although there remains an interface between the surface of the roll body 86 and the undersides of the belts 36, and although there further remains a type of edge contact between the extremities 92,94 of the roller body 86 and the undersides of the respective end belts 36', 36", such contiguous moving surfaces do not seem to present the problem otherwise presented by the belt edges 132,134 themselves when they are engaged with the roller body surface in other prior art constructions. Consequently, in the present invention the loose material merely falls through variously presented discharge openings of the baler, primarily onto the incoming flow of crop material at the pickup 56, so that the material is reintroduced into the baling chamber and applied to the forming bale.

It will also be appreciated that by avoiding a pinch point along the belt edges 132,134, the frayed ends of the bale caused by rubbing against the interior surfaces of the sidewalls 17,19 during bale formation are less likely to have their stemmy materials grabbed by the belts and pulled loose as the belts move under and around the drive roll 18. Consequently, accumulation and wrapping from this source is also reduced.

Still further, it will be appreciated that the shield 120 at each end of the drive roll 18 is effective in reducing the tendency of any loose material to move into close contacting relationship with the stub shafts 64,96 in an effort to work outwardly along the shafts and into the bearings 98,100 to cause premature failure of those important components. With the sleeve 122 of each shield assembly 120 remaining stationary and the collar 130 rotating at relatively high speed with the roll 18, the loose residue has little if any tendency to enter into the annulus defined between the interior of the sleeve 122 and the exterior of the collar 130.

FIGS. 6 and 7 show an additional form of shield assembly, such assembly being denoted by the numeral 220. As with the assembly 120, the shield assembly 220 includes a cylindrical sleeve 222 which surrounds the stub shaft 64 (shown slightly tapered in FIG. 6) and projects inwardly from the adjacent sidewall 17. The sleeve 222 is supported on the sidewall 17 in the same manner as the sleeve 122.

In lieu of the smaller diameter collar 130 of assembly 120, the shield assembly 220 has an annular cover plate 224 which is fixed to the inner end of the sleeve 222 and projects radially outwardly therefrom into close proximity with the inner cylindrical surface of the roll body 86. The cover plate 224 is substantially flush with the end extremity 94 of the roll body 86 and has an inturned marginal rim 226 that extends in a generally axial direction toward the interior of the roll body 86.

The shield assembly 220 is also effective in keeping the stray crop materials from coming into engagement with the shaft 64. The rounded nature of the marginal rim 226 is helpful in preventing sharp snag points between the rotating inner surface of the roll body 86 and the stationary cover plate 224.

The principles of the present invention relating to the overhanging belt margins are not limited in application to the drive roll 18. In fact, they may be helpful at any roll where trash and residue accumulation may be a problem. For example, it is contemplated specifically that the overlapping belt edge design may be utilized for the retaining roll 46 carried by the arm assembly 48. It will be appreciated in this respect that the stretch 36b of the belts moves generally toward the roll 46 as the belt stretch 36b leaves the rotating bale 58 adjacent the upper periphery thereof. Consequently, there is some tendency for the belt stretch 36b to carry loose materials toward the roll 46. By eliminating a pinch point between the outer belt edges and the circumferential surface of the body of the roll 46 in that area, grabbing of the loose material by the belts 36 as they move around the roll 46 to transfer the loose material into other parts of the machine can be largely reduced.

FIG. 8 shows one suggested construction for the roll 46. It will be seen in this regard that the roll 46 employs a single, stationary, non-rotating shaft 300 that extends between the two arms 48 and is fixedly secured thereto by bolts 302. The stationary shaft 300 extends through the center of the cylindrical roll body 304 and has a pair of bearing assemblies 306 that support the cylindrical body 304 for rotation upon the stationary shaft 300. The bearings 306 are pressed into the opposite ends of the cylindrical body 304 and are held against axial movement along the shaft 300 by a pair of set collars 308. The bearings 306 and the set collars 308 may conveniently comprise a well known self-locking bearing and collar assembly available from a variety of sources by those skilled in the art, including the Torrington Bearing Company of Torrington, Conn.

It will be noted that the opposite end extremities 304a and 304b of the roll body 304 are recessed with respect to the outermost belt edges 132 and 134, as in the first embodiment. Therefore, as with the roll 18, the idler roll 46 is arranged to preclude the formation of a pinch point between the outer belt edges 132,134 and the surface of the roll body 304.

Reference is hereby made to applications filed concurrently with the present application and concerning the handling of stray crop materials and residue in round balers. Ser. No. 07/811,073 (pending) in the names of Howard J. Ratzlaff et al. and titled "Round Baler Having Anti-Wrapping Core Starter" relates to a round baler which utilizes a special conveyor mechanism in lieu of a single transverse roller as a core starting means, while Ser. No. 07/811,076 (pending) in the names of Howard J. Ratzlaff et al. and titled "Round Baler Having Anti-Wrapping Idler Rolls" relates to a round baler provided with idler rolls that cause slight speed differential between different belts on the same idler roll so as to provide a self-cleaning action. The inventions of these two identifed applications form no part of the invention claimed in the present application and are identified solely for purposes of providing full disclosure.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. In a round baler, the improvement comprising:
at least one rotatable guide roll having a cylindrical body extending substantially across the full width of the baler and presenting a circumferentially extending, end edge extremity and a reduced diameter coaxial shaft portion projecting outwardly beyond said end edge extremity;
at least one flexible belt looped around said guide roll in engagement with the body and having a marginal edge; and
means for positioning the belt and roll in such a manner that a marginal edge portion of the belt overhangs said end edge extremity of the roll in the axial direction whereby to dispose said end edge extremity of the roll in recessed relationship to an outer edge of the belt, and to dispose said marginal edge portion of the belt in radially outwardly spaced relation to the shaft portion of the roll,
said positioning means including upright surface means spaced outwardly from said belt in an axial direction to dispose the outer edge of the belt between the upright surface means and said end edge extremity of the roll.

2. In a round baler as claimed in claim 1,
said upright surface means including a sidewall of the baler.

3. In a round baler as claimed in claim 2,
said shaft portion being fixed to said cylindrical body for rotation therewith,
said sidewall having a cylindrical for said shaft portion,
said positioning means further including a bearing spaced axially outwardy from said sidewall in alignment with said openings,
said shaft portion projection through said opening and into said bearing for rotational support by the bearing.

4. In a round baler as claimed in claim 1,
said roll and said belt comprising parts of variable chamber bale-forming apparatus of the baler.

5. In a round baler as claimed in claim 1,
said shaft portion comprising a stub shaft fixed to said cylindrical body.

6. In a round baler as claimed in claim 1,
said guide roll being supported by a pair of members spaced axially outwardly beyond opposite end extremities of said cylindrical body,
said members presenting said upright surface means,
said cylindrical body having a pair of said shaft portions at said opposite end extremities,
said shaft portions being fixed to respective ones of said members, said shaft portions being provided with bearing means supporting the cylindrical body for rotation on and relative to said shaft portions.

7. In a round baler as claimed in claim 6,
said shaft portions comprising opposite ends of the same shaft.

8. In a round baler as claimed in claim 7,
said members comprising a pair of arms rigidly connected to one another and mounted for up and down swinging movement within the baler for controlling the belts during bale formation.

9. In a round baler, the improvement comprising:
at least one rotatable guide roll having a cylindrical body presenting a circumferentially extending, end extremity and a coaxial shaft portion projecting outwardly beyond said extremity;
at least one flexible belt looped around said guide roll in engagement with the body and having a marginal edge; and
means for positioning the belt and roll in such a manner that a marginal edge portion of the belt overhangs said extremity of the roll in the axial direction whereby to dispose said extremity of the roll in recessed relationship to an outer edge of the belt,
said positioning means including a sidewall of the baler located adjacent said belt,
said sidewall being spaced outwardly from said belt in an axial direction to dispose the outer edge of the belt between the sidewall and said extremity of the roll,
said shaft portion being fixed to said cylindrical body for rotation therewith,
said sidewall having a clearance opening for said shaft portion,
said positioning means further including a bearing spaced axially outwardly from said sidewall in alignment with said opening,
said shaft portion projecting through said opening and into said bearing for rotational support by the bearing,
said sidewall having an annular sleeve projecting inwardly therefrom in an axial direction toward the end extremity of the roll and encircling said shaft portion to restrict access to the shaft portion and said bearing by loose particles of material within the baler.

10. In a round baler as claimed in claim 9,
said roll having an end wall affixed to said body adjacent said end extremity thereof,
said shaft portion comprising a stub shaft secured to and projecting outwardly from said end wall,
said end wall having an annular collar projecting axially outwardly therefrom in circumscribing relationship with said stub shaft,
said collar having a reduced diameter relative to said sleeve and projecting into the latter to present mutually overlapping end portions of the collar and the sleeve for retarding the ingress of loose particles of material into the sleeve.

11. In a round baler as claimed in claim 9,
said annular sleeve having an annular cover plate affixed thereto and projecting radially outwardly therefrom adjacent said end extremity of the cylindrical body,
said cover plate extending radially outwardly into close proximity to the end extremity of the cylindrical body for closing off the annular space defined between the sleeve and the cylindrical body.

12. In a round baler as claimed in claim 11,
said cover plate having an inturned marginal rim at its radially outermost periphery that is directed generally axially inwardly toward the interior of the cylindrical body.

13. In a round baler having a pair of spaced upright sidewalls, a plurality of transverse, parallel guide rolls located within the space between the sidewalls, and a series of endless flexible belts trained around said rolls in a manner to at least partially define a variable dimension baling chamber which progressively increases in size as a bale is formed therein, at least one of said rolls being located in such a position that the belts present a stretch leading generally from the bale and toward the one roll during bale formation, said series of belts including a pair of opposite end belts closest to respective sidewalls of the baler, the improvement comprising:
said one roll having an elongated cylindrical body and a pair of coaxial shaft portions projecting outwardly beyond opposite end extremities of the body, and
said end belts each having a marginal edge portion overhanging said end extremities of the body generally toward the respective sidewalls to dispose said end extremities in recessed relationship to outer edges of the end belts.

14. In a round baler as claimed in claim 13,
said one roll being supported by the sidewalls,
said sidewalls having axially aligned clearance openings for receiving said respective shaft portions,
each of said sidewalls having a bearing spaced axially outwardly therefrom in alignment with the opening in the respective sidewall,
said shaft portions projecting through said openings and into said bearings for rotational support thereby.

15. In a round baler as claimed in claim 14,
each of said sidewalls having an annular sleeve projecting inwardly therefrom in an axial direction toward the corresponding end extremity of the roll body and encircling the corresponding shaft portion to restrict access to the shaft portions and the bearings by loose particles of material within the baler.

16. In a round baler as claimed in claim 15,
said shaft portions comprising separate stub shafts fixed to the cylindrical body.

17. In a round baler as claimed in claim 16,
said one roll having opposite end walls affixed to said body adjacent said end extremities thereof,
said stub shafts being secured to and projecting outwardly from said end walls,
said end walls each having an annular collar projecting axially outwardly therefrom in circumscribing relationship with the corresponding stub shaft,
each collar having a reduced diameter relative to the corresponding sleeve and projecting into the latter to present mutually overlapping end portions of the collars and sleeves for retarding the ingress of loose particles of material into the sleeves.

18. In a round baler as claimed in claim 15,
said annular sleeve having an annular cover plate affixed thereto and projecting radially outwardly therefrom adjacent said end extremity of the cylindrical body,
said cover plate extending radially outwardly into close proximity to the end extremity of the cylindrical body for closing off the annular space defined between the sleeve and the cylindrical body.

19. In a round baler as claimed in claim 18, said cover plate having an inturned marginal rim at its radially outermost periphery that is directed generally axially inwardly toward the interior of the cylindrical body.

20. In a round baler as claimed in claim 13, said one roll comprising a powered belt drive roll supported by said sidewalls.

21. In a round baler as claimed in claim 13, said shaft portions being fixed against rotation with the cylindrical body, said shaft portions being provided with bearing means supporting the cylindrical body for rotation on and relative to said shaft portions.

22. In a round baler as claimed in claim 21, said shaft portions comprising opposite ends of the same stationary shaft.

23. In a round baler as claimed in claim 22, said one roll being carried by a pair of arms adjacent opposite ends of the roll and mounted for up and down swinging movement between the sidewalls for controlling the belts during bale formation, said stationary shaft being fixed to said arms.

24. In a round baler as claimed in claim 13, said at least one roll including a powered, belt drive roll supported by the sidewalls and located in a lower portion of the baler and an unpowered, idler roll supported between a pair of arms located inboard of the sidewalls and swingable in an up and down motion during bale formation to control the belts.

* * * * *